United States Patent
Ledentsov et al.

(10) Patent No.: US 8,447,187 B2
(45) Date of Patent: May 21, 2013

(54) OPTOELECTRONIC INTERCONNECT FOR HIGH FREQUENCY DATA TRANSMISSION AT LOW POWER CONSUMPTION

(75) Inventors: Nikolay Ledentsov, Berlin (DE); Vitaly Shchukin, Berlin (DE)

(73) Assignee: VI Systems GmbH, Berlin (DE)

( * ) Notice: Subject to any disclaimer, the term of this patent is extended or adjusted under 35 U.S.C. 154(b) by 250 days.

(21) Appl. No.: 12/929,812

(22) Filed: Feb. 17, 2011

(65) Prior Publication Data

US 2011/0206380 A1    Aug. 25, 2011

Related U.S. Application Data

(60) Provisional application No. 61/338,677, filed on Feb. 23, 2010.

(51) Int. Cl.
*H04B 10/00*    (2006.01)

(52) U.S. Cl.
USPC .............. 398/164; 398/138; 398/139

(58) Field of Classification Search
USPC .................. 398/138, 139, 164, 200
See application file for complete search history.

(56) References Cited

U.S. PATENT DOCUMENTS

| | | | |
|---|---|---|---|
| 6,203,212 B1* | 3/2001 | Rosenberg et al. | 385/92 |
| 6,665,498 B1* | 12/2003 | Jiang et al. | 398/135 |
| 6,690,845 B1* | 2/2004 | Yoshimura et al. | 385/14 |
| 7,136,594 B2* | 11/2006 | Nakanishi et al. | 398/164 |
| 2007/0224735 A1* | 9/2007 | Karashima et al. | 438/128 |
| 2011/0150475 A1* | 6/2011 | Soto et al. | 398/63 |

* cited by examiner

*Primary Examiner* — Dalzid Singh

(57) ABSTRACT

An optoelectronic interconnect which includes optical transmitter and detector having capacitances below 150 femto-Farads each suitable for transmission of optical signals at speeds at and above 20 Gigabit per second at power consumption below 10 milliWatt per Gigabit per second.

17 Claims, 3 Drawing Sheets

OPTOELECTRONIC INTERCONNECT FOR HIGH FREQUENCY DATA TRANSMISSION AT LOW POWER CONSUMPTION

REFERENCE TO RELATED APPLICATIONS

This application claims an invention which was disclosed in Provisional Application No. 61/338,677, filed Feb. 23, 2010, entitled "OPTOELECTRONIC INTERCONNECT FOR HIGH FREQUENCY DATA TRANSMISSION AT LOW POWER CONSUMPTION". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of optoelectronic devices. More particularly, the invention pertains to the field of optical links suitable for applications in long haul telecommunications, fiber-to-the home, radio over fiber, data communications and optical interconnects

2. Description of Related Art

There is a need in optical links operating at speeds above 20 Gigabit per second (Gb/s). Presently such links are realized by using power-consuming and expensive optical systems which include external modulators absorbing a significant power. For matching the needs of ever-growing serial transmission speed per wavelength per channel at low cost a new type of optical links is needed. However, the existing optical links based on standard devices suitable for data transmission rate up to 10-13 Gb/s include optical devices with a high capacitance exceeding 150 femto-Farads. It makes it difficult to realize high speed high quality data transmission in the optical link at low power consumption using these devices as the integrated circuits needed to drive this device require significant power.

A prior art optical interconnect (50) is shown schematically in FIG. 1. A modulator driver (1) representing an integrated circuit (IC) is electrically connected to the electrooptic modulator (2). The laser (3) provides lasing light of constant intensity which is modulated by electrooptic modulator (2). The electrooptic modulator (2) can be, for example, electrorefractive or electroabsorption modulator. Due to a high capacitance of the modulator device the power consumption of the driver IC is high, typically above 500 milliWatt (mW) and up to 10 Watt (W). The modulator driver is connected to the control IC (4) with a certain functionality, for example multiplexing/demultiplexing IC. The control IC (4) generates current pulses (10) that control the modulator driver (1). The modulator driver (1) generates current pulses (15) that cause the modulator (2) to modulate light. Light pulses (11) coming out from the modulator (2) are delivered from the modulator (2) by the optical waveguide (5).

The input light is delivered by the waveguide (6). The light pulses (21) delivered from the waveguide (6) come to the detector (7). The detector (7) transforms light pulses (21) into current pulses (20). Current pulses (20) are amplified by the amplifier (8). Amplified pulses of current (25) come to the control IC (4).

Various means can be used to deliver light. Light (9) from the laser (3) is delivered to the modulator (2), for example, through air or via optical system which may include lenses, optical isolators, waveguides and other elements. The current pulses (10) from the control IC (4) to the modulator driver (1) and the current pulses (20) from the from the detector to the amplifier are delivered via high frequency electrical lines.

Input (12) or output (13) pulses connect the electro-optic circuit (50) to the external devices for data acquisition. FIG. 1 shows only a part of the interconnect and a similar part is placed on the other end of the optical waveguide link. The optical waveguide link can be realized by, for example, plastic waveguide, duplex single mode fiber, duplex multimode fiber, fiber ribbon.

SUMMARY OF THE INVENTION

An optoelectronic interconnect suited for high frequency (HF) data transmission, preferably above 20 Gigabit per second (Gbps) and the most preferably above 40 Gbps capable to ultralow power consumption data transmission is disclosed. A unique combination of the parameters provides a possibility for data transmission at ultra-low power consumption (preferably below 10 mW/Gbps and most preferably below 5 mW/Gbps), as the optoelectronic interconnect includes a combination of: (i) a low capacitance optical chip suitable for generation of light pulses with rise and fall times shorter than 20 pico-second (ps) with single or multiple dielectric or air apertures, the chip being driven by either current modulation or electrooptic modulation with a capacitance preferably below 150 femto-Farads (fF) and, most preferably, below 100 fF under operation conditions; (ii) a low capacitance optical chip suitable for detection of light pulses and transforming them to current pulses with rise and fall times shorter than 20 ps with a capacitance preferably below 150 fF and, most preferably, below 100 fF under the operation conditions; (iii) a pad layout integrated on chip representing a high-frequency electric transmission line capable to 20 Gbps and preferably to 40 Gbps transmission at losses preferably below 3 dB; (iv) an electronic chip representing an integrated circuit capable to operation at preferably 20 Gbps and most preferably to 40 Gbps suitable for modulation of the light from the optical chip used for generation of light pulses; (v) an electronic chip representing an integrated circuit capable to operation preferably at or above 20 Gbps and most preferably at or above 40 Gbps suitable for amplification of current pulses of the optical chip suitable for detection of light pulses, (vi) a high-frequency-compatible substrate with HF pads to which all the above components are attached and the means of attachment suitable for HF operation; (vii) an optical system for coupling of the light from the optical chip suited for generation of light pulses to optical fiber; (viii) an optical system for coupling of light pulses from the optical waveguide to the optical chip suited for detection of light pulses, which does not disturb HF signal penetration at or above 20 Gbps and, most preferably, at or above 40 Gbps; (ix) a packaging of the optoelecronic interconnect suitable for the HF operation.

DETAILED DESCRIPTION OF THE INVENTION

Figure 1:
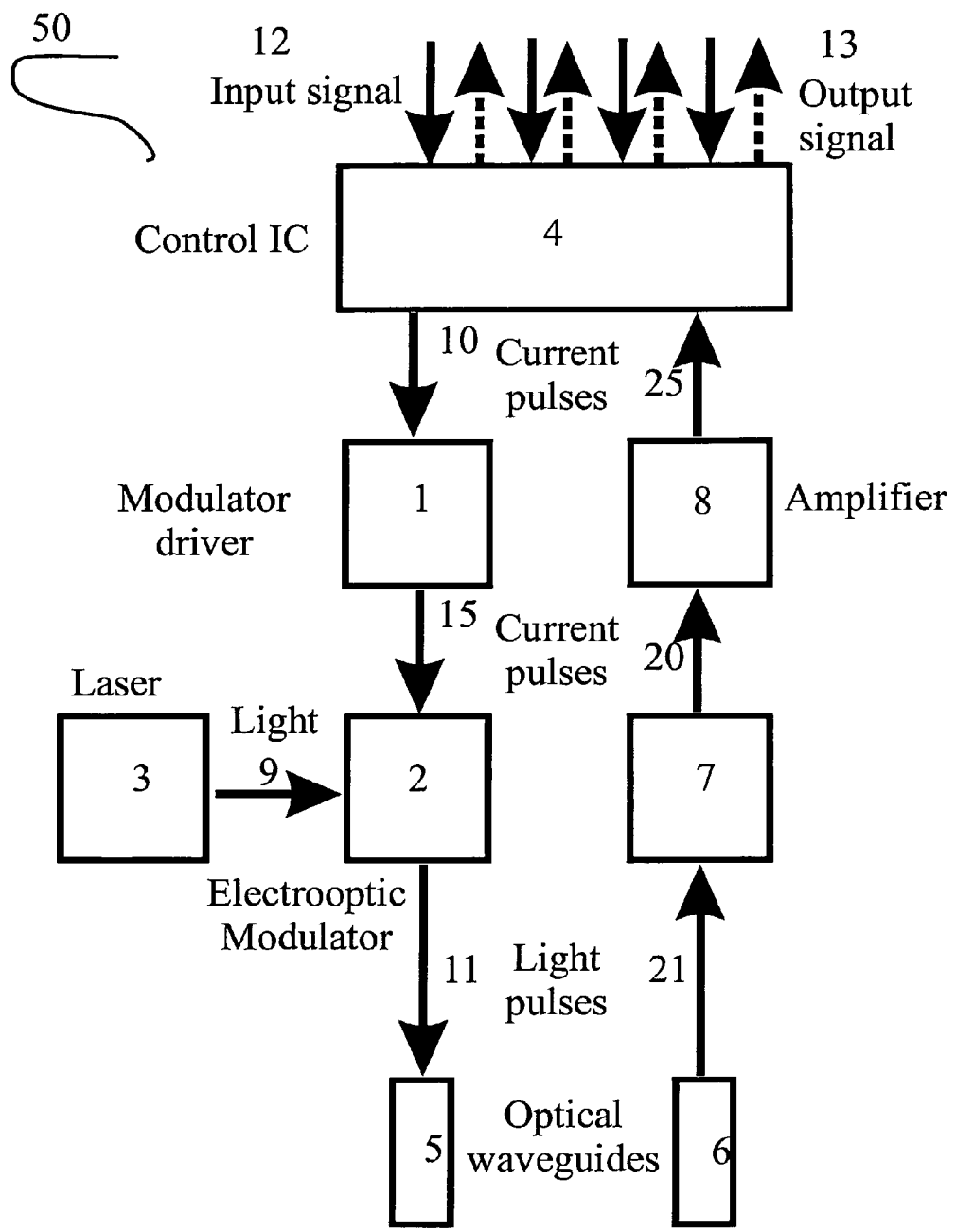
FIG. 1 shows a schematic representation of the prior art optical interconnect. The device consumes high power.
Figure 2:
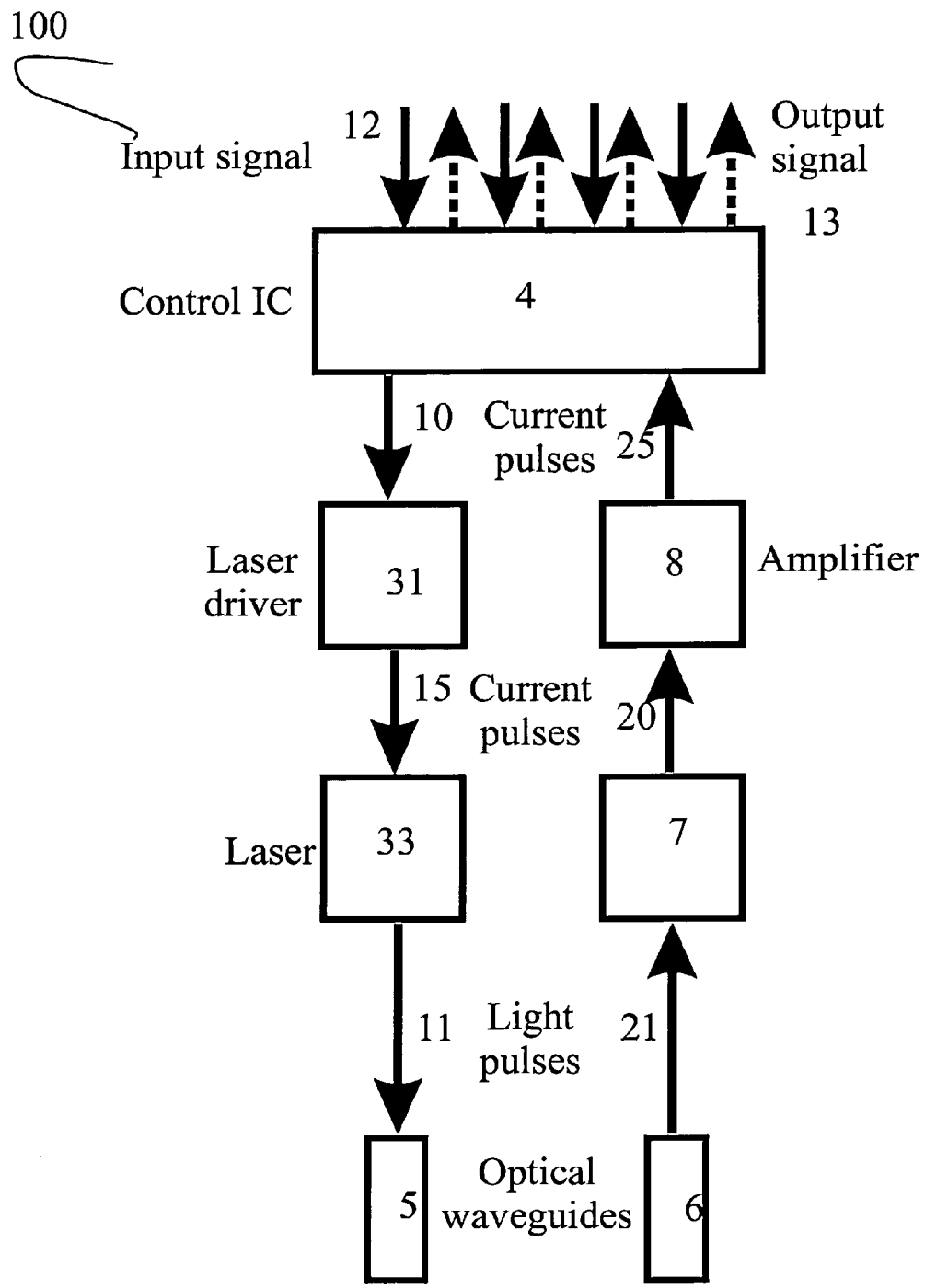
FIG. 2 shows a schematic representation of an optical interconnect according to an embodiment of the present invention.

An optical interconnect (100) according to an embodiment of the present invention is shown in FIG. 2. Opposite to the prior art of FIG. 1, the modulator section is integrated with the laser into a monolithic structure. The laser (33) is driven by the driver (31). A one skilled in the art will appreciate that the modulator section integrated with a laser can have a very low capacitance. Practically, a capacitance below 150 femto-Farad can be achieved. Further, even a lower capacitance below 100 femto-Farad can be achieved. Means to achieve such a low capacitance include, but are not limited to using dielectric apertures close to the modulator section, using multiple layer apertures, using apertures formed by air gaps, reducing the mesa size. The laser (33) including the modulator section having such a low capacitance will be capable to generate pulses of light having rise and fall time below 20 picoseconds.

The capacitance of the photodetector (8) used in the optical interconnect should be below 150 femto-Farads, and, most preferably, below 100 femto-Farads. A one skilled in the art will appreciate that the photodetector having such a low capacitance will be capable to generate pulses of current having rise and fall times below 20 picoseconds.

In order to have a pad layout capable to transmit high frequency signals at the transmission rate above 20 Gbps, and, most preferably, above 40 Gbps, with the losses below (−3 dB), the pad layout should be integrated on chip.

The laser driver (31) should be capable to operation at the transmission rate 20 Gbps. Most preferably, the laser driver (31) should be capable to operate at a transmission rate 40 Gbps.

The amplifier (8) should be capable to amplify the current pulses at the rate of 20 Gbps. Most preferably, the amplifier should be capable to amplify current pulses at the rate of 40 Gbps.

To enable the high frequency operation of the optical interconnect (100), the components (31), (33), (7) and (8) should be preferably attached to a high frequency substrate. One skilled in the art will appreciate that means of attachment should be compatible with the required high frequency operation.

All components capable to high frequency operation enable constructing an optical interconnect capable as a whole to transfer data at a high rate 20 Gigabit per second. In the preferred embodiment the optical interconnect enables data transmission at a high rate above 40 Gigabit per second.

Various types of lasers can be used in the optical interconnect. In one embodiment of the present invention this can be an edge-emitting lasers.

In another embodiment of the present invention, a vertical cavity surface emitting laser can be used in the optical interconnect system.

In yet another embodiment of the present invention, a laser used in the optical interconnect is a tilted cavity laser, as disclosed in the patent "TILTED CAVITY SEMICONDUCTOR LASER (TCSL) AND METHOD OF MAKING SAME", U.S. Pat. No. 7,031,360, filed Feb. 12, 2002, issued Apr. 18, 2006, by the inventors of the present invention, wherein the patent is herein incorporated by reference.

In a further embodiment of the present invention, a laser used in the optical interconnect is a tilted wave laser, as disclosed in the patent "EXTERNAL CAVITY OPTOELECTRONIC DEVICE", U.S. Pat. No. 7,421,001, filed Jun. 16, 2006, issued Sep. 2, 2008, and in the patent "OPTOELECTRONIC DEVICE AND METHOD OF MAKING SAME", U.S. Pat. No. 7,583,712, filed Jan. 3, 2007, issued Sep. 1, 2009, both by the inventors of the present inventions. Both patents are herein incorporated by reference.

In another embodiment of the present invention, a passive cavity device can be used in the optical interconnect, wherein the passive cavity device is disclosed in the patent application of Ledentsov "OPTOELECTRONIC DEVICE AND METHOD OF MAKING SAME", U.S. patent application Ser. No. 12/803,747, filed Jul. 6, 2010, which is herein incorporated by reference.

Different types of the photodetector can be used in the optical interconnect. In an embodiment of the present invention, the photodetector used in the optical interconnect can be a p-i-n photodetector chip.

In another embodiment of the present invention, the photodetector used in the optical interconnect, is an avalanche photodetector.

A one skilled in the art will appreciate that various concepts of modulation can be employed to modulate light coming out from the laser (31). In one embodiment of the present invention, direct, or current modulation is employed.

In another embodiment of the present invention, an indirect, or electrooptic modulation is applied to modulate light. In the preferred embodiment of the present invention the electrooptic modulation applied is electrorefraction modulation. In yet another embodiment of the present invention the electooptic modulation applied is the electroabsorption modulation.

Electrooptic modulation can be realized by using various approaches. In one embodiment of the present invention, a filter cavity approach is used as disclosed in the patent "Electrooptically wavelength-tunable resonant cavity optoelectronic device for high-speed data transfer", U.S. Pat. No. 7,369,583, filed Jun. 2, 2005, issued May 6, 2008, by the inventors of the present invention, wherein the patent is herein incorporated by reference.

In another embodiment of the present invention the concept of the electrooptic tuning of the stopband edge of a distributed Bragg reflector is applied, wherein the concept is disclosed in the patent "ELECTROOPTICALLY BRAGG-REFLECTOR STOPBAND TUNABLE OPTOELECTRONIC DEVICE FOR HIGH-SPEED DATA TRANSFER", U.S. Pat. No. 7,593,436, filed Jun. 16, 2006, issued Sep. 22, 2009, and the patent application "OPTOELECTRONIC DEVICE FOR HIGH-SPEED DATA TRANSFER WITH ELECTROOPTICALLY TUNABLE STOPBAND EDGE OF A BRAGG REFLECTOR", U.S. patent application, filed Jul. 27, 2009, both by the inventors of the present invention. Both the patent and the patent application are herein incorporated by reference.

In yet another embodiment of the present invention, the modulation of the laser light can be achieved by applying a coupled cavity approach as disclosed in the publication of Fischer et al. "Coupled resonator vertical-cavity laser diode", Applied Physics Letters, Volume 75, Number 19, pages 3020-3022, 8 Nov. 1999, wherein this publication is incorporated herein by reference.

In a further embodiment of the present invention, triggered self-pulsation approach is used to modulate the laser light as disclosed in the patent by Bimberg et al. "DATA TRANSMISSION OPTOELECTRONIC DEVICE", U.S. Pat. No. 7,580,595, filed May 9, 2008, issued Aug. 25, 2009, wherein the patent is incorporated herein by reference.

Various kinds of optical waveguides can be used in the optical interconnect. These include, but are not limited to, silicon optical waveguide, glass optical fiber, plastic optical fiber, a bundle of optical fibers. Both single mode and multi-mode optical fibers can be used.

Figure 3:
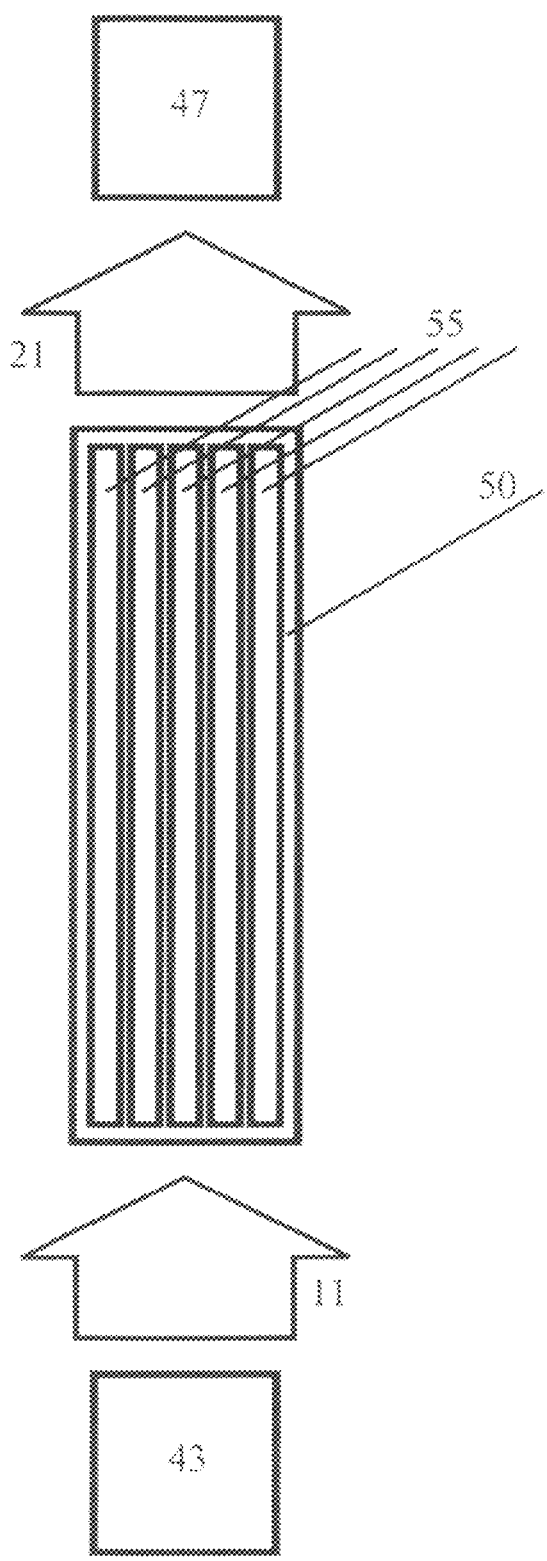
FIG. 3 shows a schematic representation of an optical link via a bundle consisting of several single mode fibers, according to an embodiment of the present invention.

FIG. 3 illustrates schematically the optical link according to an embodiment of the present invention. Using of single mode fibers is preferred to avoid mode dispersion of the optical signal and enabling transfer over a larger distance.

However, it is difficult to couple light emitted by a vertical cavity surface emitting laser to a single mode fiber, since the diameter of the single mode fiber is significantly smaller that the output optical aperture of a vertical cavity surface emitting laser. By using only one single mode fiber a significant fraction of the optical power could be lost. In the embodiment of FIG. 3 the light emitted from a VCSEL (43) is transferred via a bundle (50) combining multiple single mode fibers (55). On the other end of the optical link the light impinges on the photodetector (47). This approach combines the advantages of using a single mode fiber thus eliminating a danger of signal dispersion and using an optical fiber of a large diameter capable to receive all light from the laser. In one of the further embodiments of the present invention the bundle of single mode fibers can be fabricated within a single fiber comprising multiple single mode channels.

To couple the light from the laser to an optical waveguide and from an optical waveguide to a photodetector, various means can be used. In one embodiment of the present invention, the coupling can be provided via the near field zone of the optical device without using lenses.

In another embodiment of the present invention, lenses are used for coupling. Both external lenses and lenses can be used.

In some embodiments of the present invention Fresnel or plasmonic lenses can be used.

A one skilled in the art will appreciate that, since a modulator section integrated monolithically with a laser has a very low capacitance, the integrated circuit does not absorb a lot of power. Typical values are below 10 milliWatt per Gigabit per second. Most preferable are optical interconnects having even lower power consumption below 5 milliWatt per Gigabit per second.

Further advantage is that a very low power consumption allows using very compact device as no need in heat sinking occurs. For example, the laser (33) and the laser driver integrated circuit (31) can be matched in a TO-can package. Similarly, a photodetector (7) can be integrated with the amplifier integrated circuit (8).

In another embodiment of the present invention, both integrated circuits (31) and (8) can be matched on a single chip.

In yet another embodiment of the present invention, this single chip can be further matched with the control integrated circuit (4) to form a single integrated circuit.

In a further embodiment of the present invention the whole electrooptic circuit can be packaged into a housing having a QSFP form factor.

This single integrated circuit can be suitable to multiple applications, including but not limited to multiplexing of signals, demultiplexing of signals, electronic compensation of signal dispersion, retiming, and routing.

In another embodiment of the present invention, multiple optical chips can be used for transmitting of optical signals.

In yet another embodiment of the present invention, multiple photodetectors can be used for detecting optical signals and their transformation into electric signals.

In a further embodiment of the present invention, an optical interconnect including multiple lasers and multiple photodetectors still has a very low power consumption below 3.3 Watt.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the feature set out in the appended claims.

What is claimed is:

1. An optoelectronic interconnect suited for high frequency (HF) data transmission comprising
  a) at least one a low capacitance optical chip suitable for generation of light pulses with rise and fall times shorter than twenty (20) pico-second (ps), wherein said low capacitance is a capacitance below one hundred fifty (150) femto-Farads under operation conditions,
  b) at least one low capacitance optical chip suitable for detection of light pulses and transforming them into current pulses with rise and fall time shorter than twenty (20) pico-seconds,
    wherein said low capacitance optical chip has a low capacitance below one hundred fifty (150) femto-Farads under operation conditions,
  c) at least one pad layout integrated on chip representing a high frequency electric transmission line capable to transmission at rate twenty (20) Gigabit per second or higher,
    wherein said transmission line has losses below minus three (−3) dB,
  d) at least one electronic chip representing an integrated circuit capable to operation at a rate twenty (20) Gigabit per second or higher operating as a modulation driver to said low capacitance optical chip used to generate light pulses,
  e) at least one electronic chip representing an integrated circuit capable to operation at a rate twenty (20) Gigabit per second or higher suitable to amplification of current pulses generated by said low capacitance optical chip used for transforming of light pulses into current pulses,
  f) a high frequency compatible substrate with high frequency pads to which said components from a) through e) are attached,
  g) means for attachment of said components from a) through e) to said high frequency substrate,
  h) at least one optical waveguide,
  i) at least one optical system for coupling of light generated by said optical chip used to generate light pulses to said at least one optical waveguide,
  j) at least one optical system suitable for coupling of light coming from said at least one optical waveguide to said optical chip used for detection of light pulses,
    wherein said optical system does not disturb high frequency signal penetration at the operation rate of said optical interconnect, k) a packaging of said optical interconnect suitable for high frequency operation at the operation rate of said optical interconnect, wherein said high frequency data transmission is transmission at a speed exceeding twenty (20) Gigabit per second, wherein unique combination of said component from a) through k) provides a possibility for ultra-low power consumption, wherein said ultralow power consumption is consumption below ten (10) milliWatt per Gigabit per second (mW/Gbps).

2. The optical interconnect of claim 1, wherein said at least one optical waveguide is selected from the group consisting of:
   a) a silicon optical waveguide,
   b) an optical fiber,
   c) a bundle further comprising of optical fibers,
   d) a plastic optical fiber, and
   e) any combination of a) through d).

3. The optical interconnect of claim 2,
wherein said optical fiber is selected from the group consisting of:
   a) a single mode optical fiber, and
   b) a multimode optical fiber.

4. The optical interconnect of claim 2,
wherein said bundle further comprising of optical fibers is comprised of single mode optical fibers.

5. The optical interconnect of claim 1,
wherein said at least one low capacitance optical chip used for generation of light pulses is selected from the group consisting of:
   a) an edge-emitting laser diode chip,
   b) a vertical cavity surface emitting laser diode chip,
   c) a tilted cavity laser diode chip,
   d) a tilted wave laser diode chip,
   e) a passive cavity laser diode chip.

6. The optical interconnect of claim 5,
wherein said at least one low capacitance optical chip used for generation of light pulses employs the concept of modulation selected from the group consisting of
   a) current modulation,
   b) electrorefraction modulation using an approach selected from the group consisting of:
      I) filter cavity approach,
      II) electrooptic tuning of the stop band edge of a distributed Bragg reflector,
      III) coupled cavity approach,
      IV) triggered self-pulsation approach,
   c) electroabsorption modulation using an approach selected from the group consisting of:
      I) filter cavity approach,
      II) electrooptic tuning of the stop band edge of a distributed Bragg reflector,
      III) coupled cavity approach,
      IV) triggered self-pulsation approach.

7. The optical interconnect of claim 1,
wherein said at least one a low capacitance optical chip used for detection of light pulses is selected from the group consisting of:
   a) a p-i-n photodetector chip, and
   b) an avalanche photodetector chip.

8. The optical interconnect of claim 1,
wherein said means of optical coupling are selected from the group consisting of:
   a) direct optical coupling using at least one lens,
      wherein said at least one optical lens is selected from the group consisting of:
         I) external lens, and
         II) integrated lens; and
   b) near field optical coupling without a lens.

9. The optical interconnect of claim 8,
wherein said at least one optical lens is selected from the group consisting of:
   a) Fresnel lens, and
   b) plasmonic lens.

10. The optical interconnect of claim 1,
wherein said interconnect is used in the application field selected from the group consisting of:
   a) telecommunication,
   b) data communication,
   c) radio over fiber, and
   d) fiber to the home.

11. The optical interconnect of claim 1,
wherein at least one optical chip further comprises a set of apertures,
wherein said set of apertures comprises one or more apertures,
   wherein said apertures are selected from the group consisting of
      I) dielectric aperture,
      II) air aperture,
      III) and combination of I) and II).

12. The optical interconnect of claim 1,
wherein said at least one electronic chip representing an integrated circuit operating as a modulation driver to said at least one low capacitance optical chip used to generate light pulses and at least one said electronic chip representing an integrated circuit used to amplification of current pulses generated by said at least one low capacitance optical chip used for transforming of light pulses into current pulses are merged in a single integrated circuit.

13. The optical interconnect of claim 12,
wherein an electronic chip representing said single integrated circuit is integrated with a control integrated circuit such that said electronic chip is suitable for an application selected from the group of applications consisting of:
   a) multiplexing of signals,
   b) demultiplexing of signals,
   c) electronic dispersion compensation,
   d) retiming,
   e) routing, and
   f) any combination of a) through e).

14. The optical interconnect of claim 1,
wherein multiple optical chips are used for data transmission, and
wherein multiple optical chips are used for detection optical signals, and
wherein said at least one optical waveguide is selected from the group consisting of:
   a) one optical waveguide, and
   b) multiple optical waveguides.

15. The optical interconnect of claim 14,
wherein the total power consumption of said interconnect is below three point three Watt (3.3 W).

16. The optical interconnect of claim 15,
wherein said electronic optical components of said are packaged in a housing having a QSFP form factor.

17. The optical interconnect of claim 1,
wherein

A) said at least one a low capacitance optical chip suitable for generation of light pulses, and
B) said at least one electronic chip representing an integrated circuit used as a modulation driver to said at least one low capacitance optical chip used to generate light pulses, and
C) said at least one low capacitance optical chip suitable for detection of light pulses and transforming them into current pulses, and
D) said at least one electronic chip representing an integrated circuit used to amplification of current pulses generated by said low capacitance optical chip used for transforming of light pulses into current pulses, are packaged in a single package,
wherein said single package has a size of TO-can.

* * * * *